(12) United States Patent  
Townend et al.

(10) Patent No.: US 9,125,083 B2  
(45) Date of Patent: Sep. 1, 2015

(54) MULTIPLE ACCESS COMMUNICATION

(75) Inventors: David Townend, London (GB); Gareth David Evans, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 143 days.

(21) Appl. No.: 13/982,926

(22) PCT Filed: Feb. 16, 2012

(86) PCT No.: PCT/GB2012/000161
§ 371 (c)(1),
(2), (4) Date: Jul. 31, 2013

(87) PCT Pub. No.: WO2012/110765
PCT Pub. Date: Aug. 23, 2012

(65) Prior Publication Data
US 2013/0308451 A1    Nov. 21, 2013

(30) Foreign Application Priority Data

Feb. 18, 2011 (EP) .................................. 11250190

(51) Int. Cl.
*H04W 24/00* (2009.01)
*H04W 74/08* (2009.01)
*H04W 28/02* (2009.01)
*H04L 1/00* (2006.01)
*H04L 1/18* (2006.01)
*H04W 28/18* (2009.01)

(52) U.S. Cl.
CPC ......... *H04W 28/0236* (2013.01); *H04L 1/0009* (2013.01); *H04W 74/085* (2013.01); *H04L 1/18* (2013.01); *H04W 28/18* (2013.01)

(58) Field of Classification Search
USPC .................................. 370/235, 252, 328, 445
See application file for complete search history.

(56) References Cited

U.S. PATENT DOCUMENTS

| | | |
|---|---|---|
| 6,591,382 B1 | 7/2003 | Molloy et al. |
| 7,385,945 B1 | 6/2008 | Olson et al. |
| 7,844,278 B1 | 11/2010 | Ross et al. |
| 2005/0053037 A1 | 3/2005 | Ginzburg et al. |

(Continued)

FOREIGN PATENT DOCUMENTS

| | | |
|---|---|---|
| EP | 1 641 185 | 3/2006 |
| WO | WO 2005/112325 | 11/2005 |

OTHER PUBLICATIONS

Lili Qiu et al., "Troubleshooting Wireless Mesh Networks", ACM SIGCOMM Computer Communication Review, vol. 36, Issue 5, Oct. 2006 (10 pgs.).

(Continued)

*Primary Examiner* — Andrew Lee
(74) *Attorney, Agent, or Firm* — Nixon & Vanderhye P.C.

(57) ABSTRACT

The application concerns interference mitigation in a CSMA/CA system (e.g. WLAN/WIFI); a distinction is made between two kinds of interference, namely "noise" and "congestion/collision"; a measure of congestion is determined as follows: if packets are queued waiting for transmission, a timer is started and the clear channel assessment (CCA) function is initiated. Periodically a check is made to determine whether a channel is available and when a channel becomes available the first queued packet is transmitted and the timer is stopped. The value recorded by the timer is used to indicate a measure of congestion.

27 Claims, 5 Drawing Sheets

(56) References Cited

U.S. PATENT DOCUMENTS

| | | | |
|---|---|---|---|
| 2005/0129051 A1* | 6/2005 | Zhu et al. | 370/445 |
| 2005/0157676 A1 | 7/2005 | Kwak et al. | |
| 2005/0249157 A1 | 11/2005 | Qian et al. | |
| 2005/0268181 A1 | 12/2005 | Murty et al. | |
| 2006/0067226 A1 | 3/2006 | Chandra et al. | |
| 2008/0008298 A1* | 1/2008 | Kirla | 379/88.03 |
| 2008/0056200 A1* | 3/2008 | Johnson | 370/333 |
| 2008/0144493 A1* | 6/2008 | Yeh | 370/230 |
| 2009/0213740 A1* | 8/2009 | Ganguly et al. | 370/252 |
| 2009/0252053 A1 | 10/2009 | Leith et al. | |
| 2010/0182907 A1* | 7/2010 | Pinter et al. | 370/235 |
| 2010/0233963 A1* | 9/2010 | Harada et al. | 455/63.3 |
| 2010/0290355 A1* | 11/2010 | Roy et al. | 370/252 |
| 2010/0302969 A1* | 12/2010 | Duenyas et al. | 370/252 |
| 2011/0090885 A1* | 4/2011 | Safavi | 370/338 |
| 2011/0205961 A1* | 8/2011 | Santivanez et al. | 370/328 |

OTHER PUBLICATIONS

Guoquing Li et al., "Spectrum-sensing based interference mitigation for WLAN devices", Communication Systems Software and Middleware and Workshops, 2008, Comsware 2008, $3^{rd}$ International Conference on, IEEE, Piscataway, NJ, $6^{th}$ Jan. 2008, pp. 402-408.

European Search Report dated Jul. 7, 2011 issued in EP 11 25 0190.

International Search Report for PCT/GB2012/000161 mailed Feb. 16, 2012.

"Draft Amendment to Standard for Information Technology a Telecommunications and Information Exchange Between Systems a Local and Metropolitan Networks a Specific Requirements—Part 11: Wireless LAN Medium Access Control (MAC) and Physical Player (PHY) Specifications: Amendment 3; Wireless Access in", IEEE Draft, vol. 802.11p, No. D1-., Feb. 28, 2006, pp. 1-71.

Li et al., "Spectrum-sensing Based Interference Mitigation for WLAN Devices", Communication Systems Software and Middleware and Workshops, 2008, Comsware 2008, $3^{rd}$ International Conference on IEEE, Jan. 6, 2008, pp. 402-408.

* cited by examiner

MULTIPLE ACCESS COMMUNICATION

This application is the U.S. national phase of International Application No. PCT/GB2012/000161 filed 16 Feb. 2012 which designated the U.S. and claims priority to EP 11250190.3 filed 18 Feb. 2011, the entire contents of each of which are hereby incorporated by reference.

BACKGROUND AND SUMMARY

This invention relates to communication systems using "Carrier Sense Multiple Access with collision avoidance" (CSMA/CA), and in particular to the recovery of a failing connection in such a network. CSMA/CA systems allow communication using distribution protocols such as those complying with the IEEE 802.11 radio communication standards known as "WiFi", or powerline communications (PLC) access systems which make use of electricity power supply wiring. In such systems individual terminals do not have exclusive use of an individual channel, but instead they queue data frames for transmission whenever a timeslot becomes available. The distribution protocols include processes for prioritising frames from certain sources, or of certain types, and also for introducing a random element in order to reduce the possibility of several transmitters attempting transmission at the same instant. Moreover, unlike a cellular telephony system in which a channel allocation plan is imposed to avoid interference between individual base stations for the same spectrum, the less regulated "WiFi" environment does not have such constraints and several wireless local access networks (WLAN) may be operating independently within range of each other. Address information carried in a frame header is used to separate the data carried by the various networks, which are all allowed to compete for the same bandwidth. This specification will primarily discuss radio applications, but is not limited thereto and the invention may be used in other wireless technologies such as ultrasound, as well as other shared media technologies such as the powerline access communications systems discussed above.

In a multiplex system such as TDMA (time division multiple access) or FDMA (frequency division multiple access) each user is allocated a channel for the duration of a connection, with a guaranteed fixed bandwidth allocation (or none at all if no channels are available). In a CSMA/CA system no channel (timeslot/frequency) is allocated for the exclusive use of any particular transmitter, so such systems make better use of available spectrum than is possible with multiplex systems. However, because all users are competing for access to the same bandwidth, delays in transmission can occur because of congestion, should the total bitrate demand by users exceeds that available. Congestion results in frames being delayed, either because a transmitter is unable to identify any timeslots available for transmission of the frames, or because two transmitters both send frames simultaneously, resulting in a "collision" in which one or both frames may be corrupted, and have to be retransmitted.

"Collision avoidance" is a technique in which each transmitter, after it detects that a channel is clear, implements a random delay ("backoff") before transmitting the next frame. This random delay reduces the probability of a collision between two frames originating from different transmitters both detecting the clear channel.

In this specification a distinction is made between two kinds of interference: herein referred to respectively as "noise" and "congestion". The term "congestion" is the presence of communications competing for capacity on the same channel. Congestion can result in frame collisions caused, for example, by two transmitters both transmitting data frames to the same receiver at the same time. Depending on the relative signal strengths of the signals at the receiver, one or both frames may be corrupted by the other such that it is not recognisable by the receiver. Unless the signal strengths are very different, in many cases neither signal can be identified.

In contrast, the term "noise" is used to mean the presence of unwanted non-coherent energy, resulting from natural or artificial sources, detectable on the same frequency, or a related one such as a harmonic. Noise is a conflict between a single desired signal and an interferer, as distinct from congestion, which is a conflict between two or more desired signals competing for the same channel space.

Congestion may occur as a result of a large number of user terminals attempting to access a single access point, or a few terminals each attempting to use a high-bandwidth service at the same time, or competition for bandwidth between neighbouring access points forming parts of different local access networks but using the same spectrum resources.

Both congestion and noise can result in frames being lost through corruption of the signal. In the case of congestion the corruption is caused by two simultaneous frames "colliding" so that the result is the logical sum of both frames, each having been corrupted by the other. Depending on the relative signal strengths, either or both frames may be undecipherable by the receivers for which they are intended.

Measures to compensate for a noisy channel can include increasing power to improve the signal-to-noise ratio, instigating a network re-configuration such as changing from two parallel data streams to one duplicated stream, changing channel (frequency, timeslot, etc), modifying a channel-hopping sequence to avoid a noisy channel, adding error correction measures to transmissions, handing over the transmission from one base station to another, or switching to a modulation scheme which is more robust—that is to say, one with fewer bits per symbol.

However, some measures taken to compensate for interference (noise) would have a neutral, or even detrimental, effect if the actual problem is congestion. For example, a system may react to noise by changing to use a more robust modulation scheme, (e.g. changing from QPSK (quadrature phase shift keying) to BPSK (binary phase shift keying), or from a complex QAM (quadrature amplitude modulation) constellation to a simpler one. Such a change can have an adverse effect upon congestion as the reduced number of bits per symbol effectively reduces the bit rate, and thus increases the time occupied by the channel to transmit a given quantity of data. In another example, switching channels will not overcome overall congestion in the system, whilst adding error correction will increase the required bit rate, and thus make congestion worse.

Measures appropriate to mitigate the effects of noise may make congestion worse, and vice versa. It has also been recognised that the effectiveness of most congestion-mitigation measures rely on the relative absence of other interference.

The present invention addresses this issue by providing a method of operating a communications node in a carrier sense multiple access communications system with collision avoidance, in which the node measures the time that it takes for a transmitter to access a channel, and derives therefrom a measure of availability of capacity in the network for the transmission of data.

In another aspect the invention provides a carrier sense multiple access collision avoidance communications system node having a transmitter for transmitting data over a communications channel, frame transmission queuing system for maintaining a queue of data for transmission, and having a congestion detection processor for measuring the time that it takes for the transmitter to access a channel, and to determine therefrom the availability of capacity in the network for the transmission of the remaining data in the queue.

The invention therefore provides a measure of congestion derived from the time (either an absolute measure or based on discrete time slots) the device has to wait before the channel is clear, WiFi systems use a "Clear Channel Assessment" (CCA), so congestion can be assessed by starting a timer and then checking the CCA periodically until the channel is clear to transmit. When the channel becomes clear the timer is stopped. This measure could be run continuously, or only when the system has a packet of data ready to send; in this case the timer would start as soon as the data is available to send and stop when it is actually sent.

The process may be repeated over a longer duration so that the fraction of time that the channel is clear over a statistically more significant time period is assessed.

As well as measuring the time needed to access a channel, other criteria which may be used to determine the current loading of a channel include measuring the number of free/busy slots within a time period, or comparing traffic that is received against traffic that is expected (eg beacon signals transmitted from access points, or acknowledgements of previously transmitted data) to determine what proportion of that expected traffic is missing.

This congestion information may be combined with a noise measure to enable a good decision on transmission to be made, based upon both noise and congestion. In the preferred embodiment, if the noise detected is initially above the predetermined threshold, channel management techniques are implemented to attempt to reduce the noise level, and if the measures are successful, the availability of slots for transmission is determined and the data management processes performed.

It should be noted that the congestion management processes are therefore only implemented if it is determined that noise levels are below a predetermined level. It has been found that in the presence of a noisy channel, effective congestion management is not practical. Indeed, in some cases implementation of channel management techniques such as additional error checking overhead would result in an increase in the required bit rate, whilst implementation of the data management techniques necessarily require a decrease in the bit rate. Thus, for example channel management may be implemented by reducing error checking bits, but this can only be done reliably if it has already been determined that the channel is not so noisy that less rigorous error checking procedures are adequate.

The modification of the data for transmission in the event of low availability of such slots may take many forms. The node may modify the data by deleting low priority traffic from the queue. Other remedies include the application of measures to maintain a guaranteed quality of service to certain users or applications, for example by selective degradation of bit rate, or forcing lower priority users or applications to an idle or inactive state, or to listening only mode, or to hand over to another system, in order to maintain a guaranteed quality on other, higher priority users and applications. Such measures are known as "QoS" (Quality of Service) measures.

The modification of data may involve changing the medium by which the data is sent, rather than dropping it altogether. For some network terminations a network configuration change may be possible, for example handover of a dual purpose handset from WLAN to cordless (DECT) or cellular (GSM) capability, or from one type of connection (e.g. powerline) to another type of connection (e.g. wireless) to the same or another router.

A wireless router may also have the capability to signal to another router within range that it is experiencing congestion, so that the routers may co-operate so as to change the channel on which data is being transmitted, or otherwise reduce channel loading. In this case, the node which modifies data is responding to a message from another node reporting congestion, rather than responding to congestion it has detected directly.

BRIEF DESCRIPTION OF THE DRAWINGS

An embodiment of the invention will now be described by way of example and with reference to the drawings, in which.

DETAILED DESCRIPTION OF PRESENT EXAMPLE EMBODIMENTS

Figure 1:
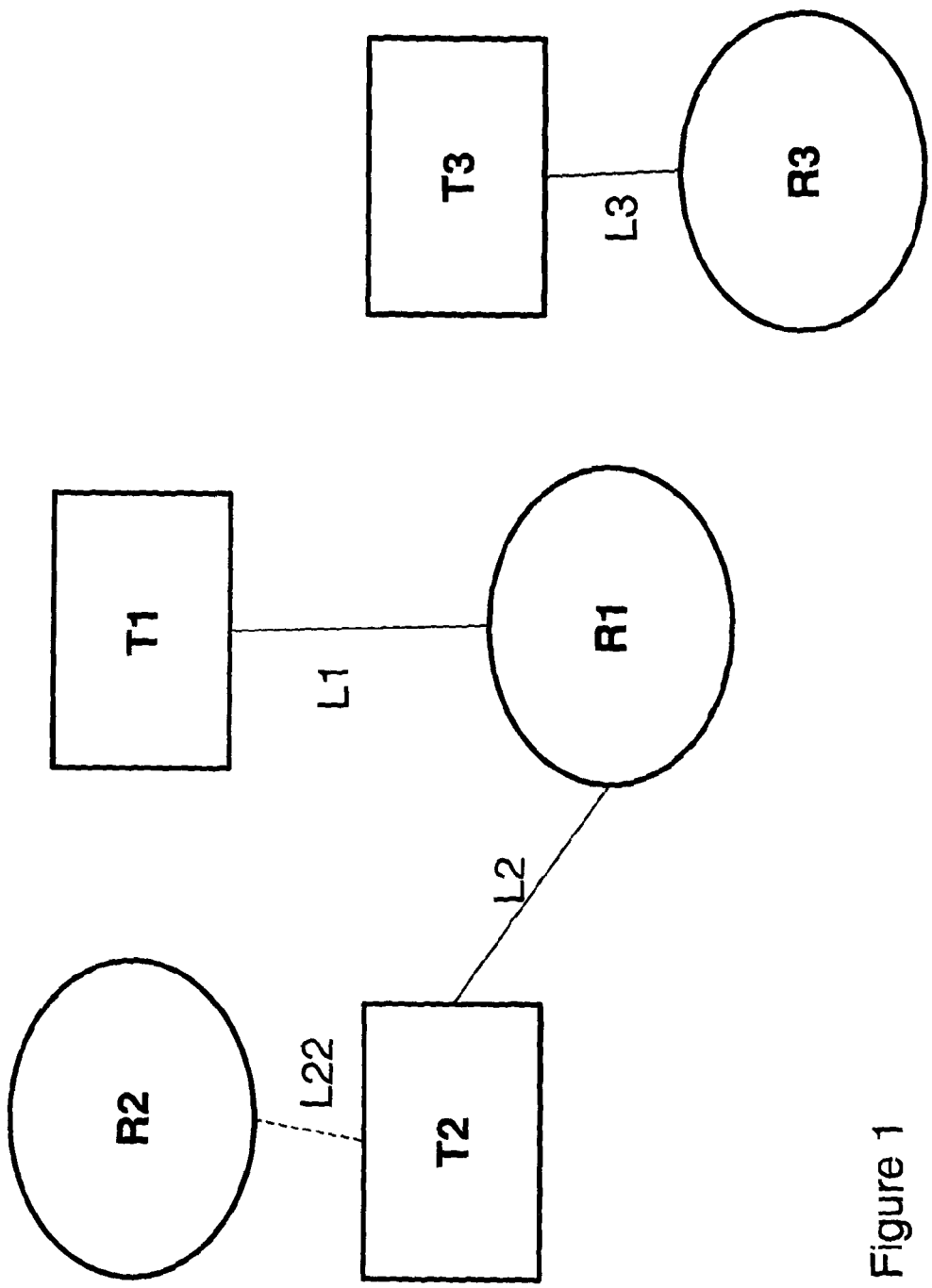
FIG. 1 is a schematic representation of a number of network routers, together with user terminals communicating with the routers.

FIG. 1 is a schematic representation of three network routers R1, R2, R3. Two user terminals T1, T2 are depicted as being currently in communication with a first router R1 through respective links L1, L2, and a third terminal T3 in communication with another router R3 through a link L3, but one or more of the terminals (as shown for terminal T2) may be capable of handing over from one router R1 to another router R2, using a new link L22, or to a different communications medium altogether (not depicted). For the purposes of illustration it will be assumed that routers R2 and R3 are both within range of the router R1, but not of each other. The various communications links L1, L2, L22, L3, between the routers and terminals are of a kind which share a medium, for example wireless, powerline, etc, so conflict for capacity may arise between them.

Figure 2:
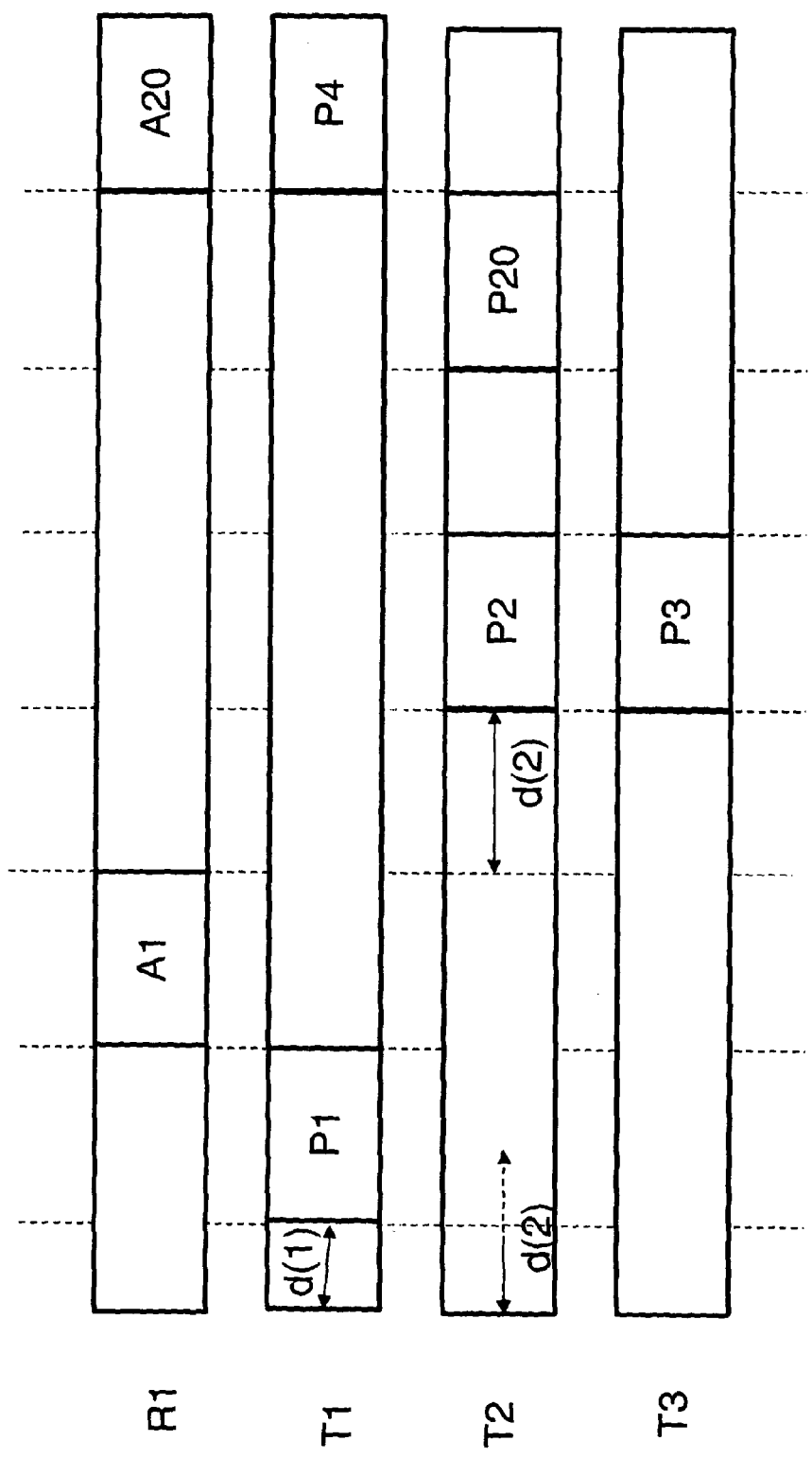
FIG. 2 is a schematic depiction of the problem of congestion

FIG. 2 depicts in schematic form a series of frame transmission windows for the router R1 and the three terminals T1, T2, T3. Note that terminals T1 and T2 are working to the router R1, but that terminal T3 is working to a different router. However, as they are all working on the same communications medium, conflicts may occur.

Individual terminals T1, T2 working to the router R1 select times for transmission of frames P1, P2, P4. (Although individual frames are depicted as all being the same length, this is not necessarily the case in reality).

It is conventional for an individual node to select an offset delay d(1), d(2) after the channel becomes clear for transmission of such a frame. This selected delay includes a random element to reduce the possibility of conflict. Thus in normal operation, in the absence of congestion, a terminal T1 may transmit a frame P1 in one window, and a terminal T2 transmit a frame in a later window. Note that terminal T2 does not transmit after the first interval d(2), because another terminal T1 has transmitted a frame before the expiry of d(2). The interval d(2) restarts after each such interruption. If a router R1 detects a frame P1 addressed to itself, it processes the frame as appropriate, for example by adding it to a queue for forwarding to another terminal, and transmits an acknowledgement A1.

However, a frame P2 may arrive at its destination at the same time as another frame P3 transmitted from another transmitter T3 on the same channel, and may "collide": if the signal strength of the frame P3 at the receiver R1 is significant, it may corrupt the signal P2 detected by the receiver R1. Since this garbled content includes the addressing data, the intended destinations of these frames may not even recognise the frames as intended for them, and will therefore disregard them.

If a transmitter R1 fails to receive an acknowledgement of a frame (e.g. P2), it will retransmit the frame (P20). If this second frame is received by the router R1, the router will generate an acknowledgement (A20). However, acknowledgements may themselves be lost due to collisions with other frames, as depicted for frames A20 and P4. A frame will be retransmitted if the transmitter fails to receive an acknowledgement for it, whether that is because the frame was not received (and thus no acknowledgement was generated) or because the acknowledgement, although transmitted, itself failed to be detected by the originator of the frame to which it relates.

As well as acknowledgements, other control frames such as beacons may also be lost through collisions with frames from other local networks.

Figure 3:
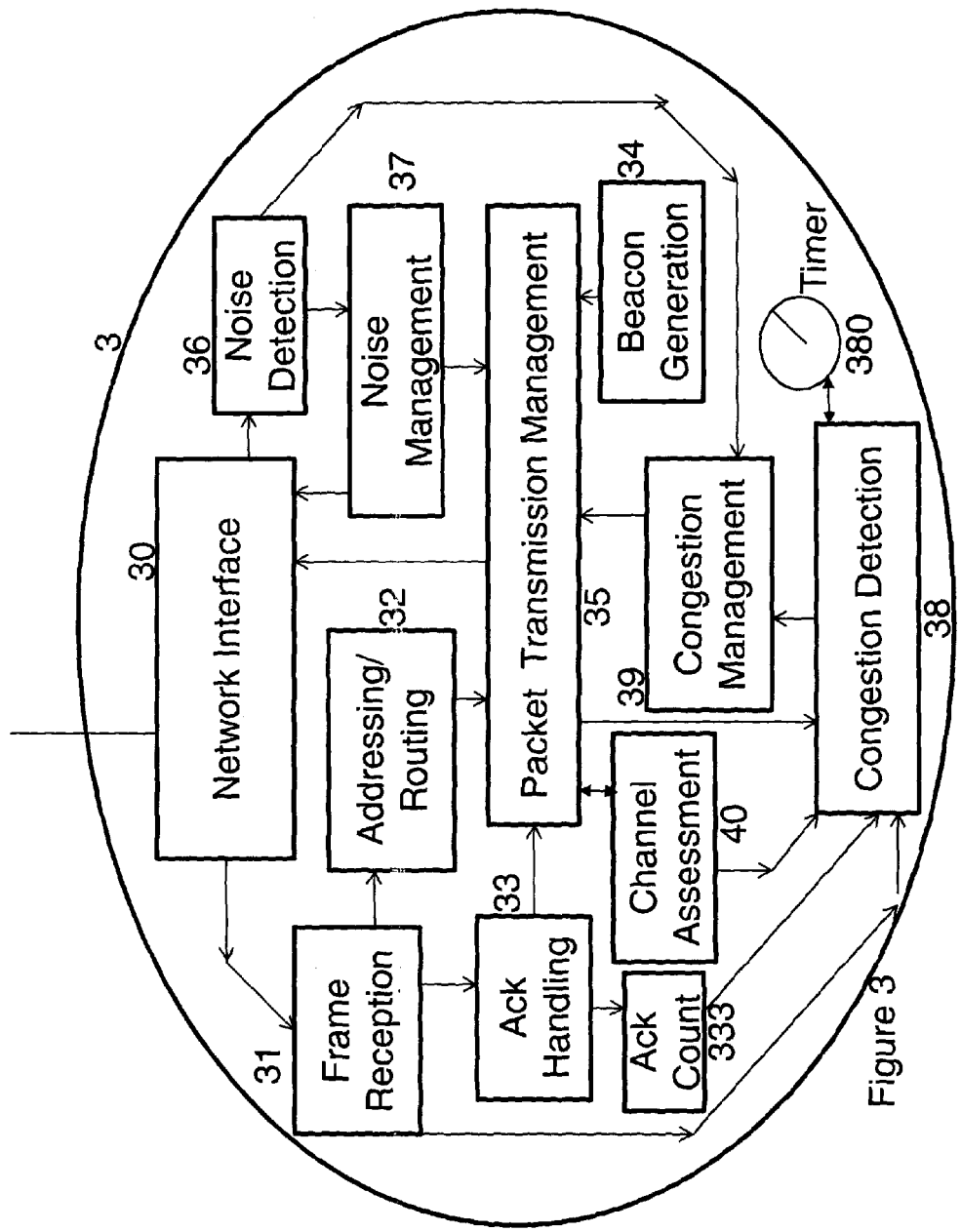
FIG. 3 is a schematic depiction of a network router for operation according to the invention

The functional elements of a node which co-operate to perform the invention are depicted in FIG. 3. The node may be a router or a user terminal. The communications protocols operate in a similar manner in both cases, but the router manages the overall control functions, such as beacon generation 34, and in the end user terminals the addressing function 32 in particular would be simpler as, in normal use, all communication to and from a given terminal passes through a single router, but the router may also handle other terminals. Conversely, user terminals typically have other functions not normally found in specialised routers, such as complex user interfaces, data storage media, and in some cases more than one communications port, allowing connection to two or more different communications media.

It should be understood that in practice the functions specified herein may be implemented in firmware or software downloaded to a general-purpose processor for the purpose, either during manufacture of the device or at a subsequent upgrade. For present purposes the node will be considered to be a router.

The node 3 has a network interface 30 through which communication is made with other devices in the network. Communication may be through powerline, wireless, or any other contended medium—that is to say one to which the router does not have exclusive use. (The router may also have access to an alternative communications medium such as an Ethernet connection, ADSL "broadband" connection to the "Internet", etc, but it is the management of a medium shared with other unrelated users, such as WiFi, which is of interest here).

Transmissions received at the interface 30 are handled by a frame reception function 31 which identifies frames addressed to the node and decodes them for further handling. In many cases, particularly in a router, the further handling requires forwarding to another terminal and this function is handled by an addressing/routing function. An acknowledgement function 33 generates an acknowledgement for any received frame which is not itself an acknowledgement. The acknowledgement function 33 also detects incoming acknowledgements in order to determine whether any frames require retransmission.

Control signals such as beacons are generated by a control function 34. The control signals, new frames for transmission, frames for retransmission as determined by the acknowledgement handling function 33, and new acknowledgements generated by the acknowledgement handler 33 are co-ordinated by a frame transmission management function 35 which queues the frames for transmission over the network interface 30 when timeslots become available. The router transmits in predetermined timeslots, leaving gaps in transmission for receipt of transmissions from the subordinate terminals T1, T2. As has already been described, the timing of the transmission of frames from these subordinate terminals T1, T2 etc includes a random element to reduce the possibility of collisions.

WiFi systems use a "Clear Channel Assessment" (CCA) system 40, which detects when a channel is clear so that a packet may be transmitted by the transmission management system 35.

The network interface 30 includes detection means 36 for detecting noise on the transmission medium, and a noise management function 37 for mitigating the effects of such interference, such as selecting a different channel, increasing the transmission power to improve the signal-to-noise ratio, or adding additional error-checking data to the queue of frames to be handled by the frame transmission management function 35.

However, as described above, different measures are appropriate in the case of congestion, and the present invention incorporates a congestion detection function 38, with an associated timer 380, which implements a number of measures to detect and mitigate the effects of such congestion. In particular, it takes an input from the Channel assessment function 40.

In the embodiment to be described, this congestion detection function is initiated if the noise detection function 36 indicates that noise levels are below a predetermined level, either as a pre-existing condition or in consequence of the implementation of the noise management function 37.

Inputs to the congestion detection function 38 include monitoring the clear channel assessment function 40 and the acknowledgment function 33 to determine whether expected frames, such as beacons and acknowledgements are being received, and to detect how much conflicting traffic (i.e. not recognised as addressed to the router) is being carried on the medium. Such other traffic will include frames originally addressed to the router but which have not been recognised by the frame reception function 31 because they have been corrupted by collisions with each other, or with frames intended for other addresses. Note that the rate of collisions depends on the total amount of traffic sharing the communications medium. Collisions may occur between terminals T1, T2 both forming part of a single local network (working to one router R1 or a set of linked routers), or to different such networks (working to several different routers R1, R2, R3 acting independently).

Relevant inputs at the frame reception handler 31, particularly in a router R1, may also include congestion reports from terminals T1, T2 under its control.

The frame transmission management system 35 may also report to the congestion detection function 38 the length of the queue of frames awaiting transmission.

Figure 4:
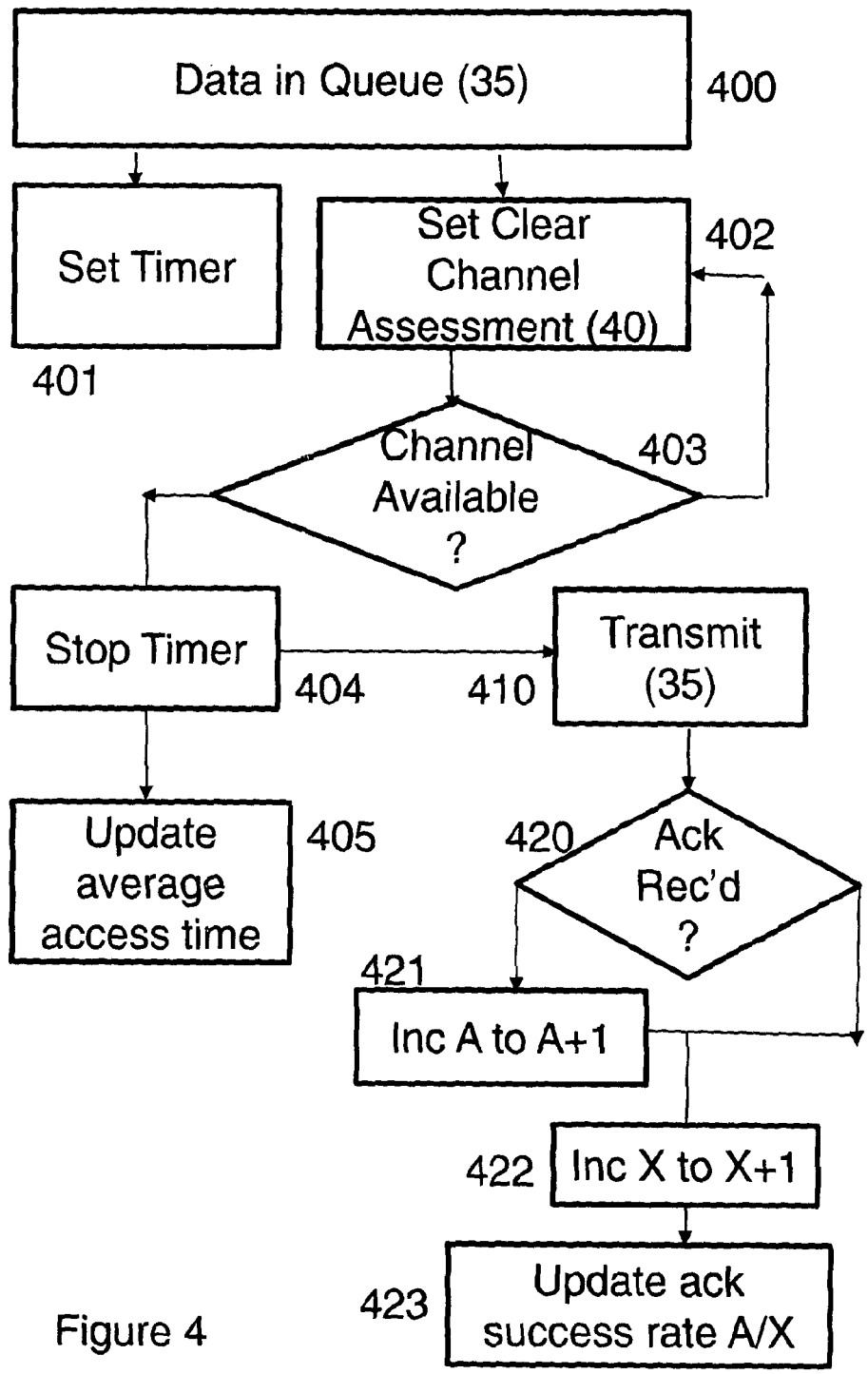
FIG. 4 is a flow diagram depicting a process according to the invention.

The congestion detection function 38 will now be described in more detail with reference to FIG. 4.

When the packet transmission management system 35 holds packets queue waiting for transmission (step 400), the timer 380 is set (step 401) and the "clear channel assessment" function 40 initiated (step 402). Periodically a check is made (step 403) to determine whether a channel is available. When a channel becomes available the first packet in the queue 31 is transmitted by the transmission management system 35 (step 410) and the timer is stopped (step 404). The congestion detection system 38 uses the value recorded by the timer 38 to update the average access time required for transmission of a packet. This value can be determined as a "rolling average" of a specified number of packets (the average wait for a channel to become available: $(\Box t_n)/N$, where $t_n$ is the time recorded for each packet, and "n" takes values from 1 to N. Alternatively it may be averaged over a fixed time period T, the average being T/N where N is the number of packets successfully transmitted in the period T, i.e. the value of "N" for which $\Box t_n = T$.

In addition, a further measure of congestion may be generated by determining the proportion of transmitted packets for which an acknowledgement is received or the time taken for the acknowledgement to be received. Assuming the channel is symmetrical (i.e an acknowledgement is no more or less likely to be corrupted or lost than the packet it is acknowledging), the likelihood of any individual signal being corrupted (i.e the level of congestion) is proportional to the square root of the detected failure rate. For example, if 10% of packets are corrupted, then only 90% of packets that are transmitted are received and acknowledged. However 10% of the acknowledgments are also lost. Thus, the original transmitting station will detect acknowledgements for 90%×90%=81% of the packets it transmitted.

The congestion management system measures the congestion level by recording, for every packet transmitted by the transmitter 35 (step 410) whether an acknowledgement is received by the acknowledgment handler 33 (step 420). If an acknowledgment is received a counter 333 increments each of two values A (acknowledgements) and X (transmissions) by 1 (steps 421, 422). If no acknowledgement is received within a predetermined interval, only the value X is incremented (step 422). The counter 333 thus maintains a running average of the proportion A/X of transmitted packets for which acknowledgements are received.

The congestion detection system 38 may also use other inputs to determine the extent of congestion on the transmission medium, for example by measuring the number of free/busy slots within a time period, or counting the proportion of management traffic that is missed (eg missed beacons in WiFi). This information is then combined with the noise measure described elsewhere to enable a good decision based upon noise and congestion to be made.

Figure 5:
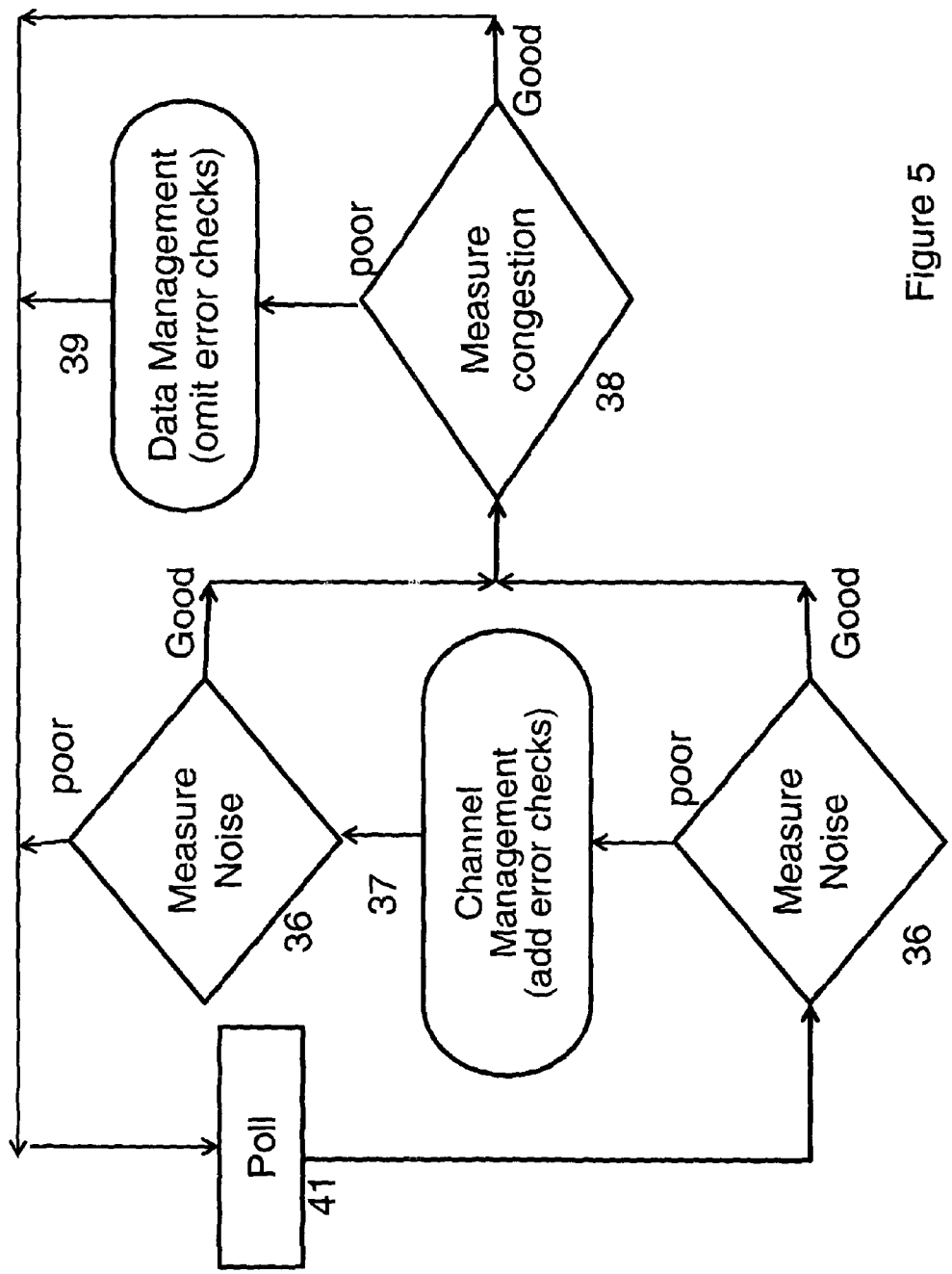
FIG. 5 is a schematic depiction of a process for controlling the network router of FIG. 3, making use of the process of FIG. 4.

The channel management process is shown schematically in FIG. 5. Periodically the channel is polled to measure noise levels (36). If they are poor, mitigation measures (37) are implemented, such as such as selecting a different channel, increasing the transmission power to improve the signal-to-noise ratio, or adding additional error-checking data to the queue of frames to be handled by the frame transmission management function 35. If the mitigation measures are unsuccessful, and the noise measurements remain at a high level, the terminal does not measure congestion levels as the noise level is too great for any effective mitigation to be achieved, and awaits the next polling prompt 41.

If noise measurements 36 are below the predetermined level at which congestion can be addressed, either with or without the intervention of mitigation measures 37, the congestion detection function 38 determines whether any mitigation strategy is required, and the data is used by a congestion management function 39 to control the frame transmission system accordingly. Such strategies will often include co-operation between a router R1 and the terminals T1, T2 under its control, for example a terminal T1 may simply generate congestion reports for transmitting via the frame transmission queue 35 and network interface 30 to the controlling router R1. Conversely, the router's mitigation strategy may include transmitting instructions via the frame transmission queue 35 and network interface 30 to the individual terminals. (These congestion management frames will of course contribute to the very congestion they are attempting to mitigate, and their prioritisation in the queue will depend on how urgent it is that the congestion is reduced)

Congestion management strategies may include the prioritisation of important traffic, disconnection of lower priority users or applications, or network configuration changes such as handover of a terminal to another technology, frequency, channel or router (for example in FIG. 1, transferring terminal T2 from control by router R1 to control by router R2, thus reducing the load on router R1), or broadcasting a signal to other network routers that congestion is being experienced, as they may be able to move or reduce channel loading. For example, with reference to FIG. 1, consider a first router R1 experiencing potential conflict with a router R2 working on the same frequency, and unable to switch to a second frequency because another router R3 is working on that second frequency. However, if the routers R2 and R3 are not in range of each other, one of them could change channel so that both routers R2, R3 operate on a common frequency without conflict, leaving the other channel clear for the router R1 to use.

The frequency of polling 41 may be varied, for example according to the degree of congestion and/or noise detected, the severity of the measures imposed, the time since the most recent adjustment, etc.

What is claimed is:

1. A method of operating a communications node in a carrier sense multiple access communications system with collision avoidance the method comprising:
   the node measuring properties of a communications channel indicative of noise on the channel,
   if noise is detected above a predetermined threshold, the node implementing a channel management process to attempt to reduce the noise level, and
   only if the channel management process is successful in reducing the noise level below a predetermined threshold, when the node has a queue of data to transmit, the node measuring the time that it takes to gain access to a channel for transmission of the data, and deriving therefrom a measure of availability of capacity in the network, and operating a data management process to reduce the number of bits in the transmission to a level where collisions are minimised.

2. A method according to claim 1, wherein the measurement of availability of capacity includes measurement of the fraction of time that the channel is available to a transmitter to make transmissions.

3. A method according to claim 1, wherein the measurement of availability of capacity includes a comparison of traffic received at a node against traffic that is expected to be received in response to transmitted data, to determine what proportion of that expected traffic is missing.

4. A method according to claim 1, wherein in the event of low availability of capacity for data transmission being detected by a node, the node deletes low priority traffic from the queue of data awaiting transmission.

5. A method according to claim 1 in which implementation of the channel management process would result in an increase in the required bit rate, whilst implementation of the data management process would result in a decrease in the required bit rate.

6. A method according to claim 5, in which the bit rate is varied by adding or omitting error checking data.

7. A method according to claim 4, wherein in the event of low availability of slots for data transmission being detected by, or reported to, a controlling node, the controlling node instructs one or more subordinate nodes to apply measures such that a guaranteed quality of service is maintained to certain users or applications.

8. A method according to claim 7, wherein the data management measures include selective degradation of bit rate, disconnection, forcing to an idle or inactive state, or forced handover to other systems of lower priority users or applications in order to maintain the guaranteed quality on other, higher priority users and applications.

9. A method according to claim 7, wherein the data management measures include disconnection, or forcing to an idle or inactive state, or forced handover to other systems, of lower priority users or applications in order to maintain the guaranteed quality on other, higher priority users and applications.

10. A method according to claim 1, in which, in the event of low availability of slots for data transmission being detected, a node undergoes a network configuration change.

11. A method according to claim 1, wherein a first node signals to a second node that it is experiencing congestion, and the nodes co-operate so as to reduce loading on channels on which they are both operating.

12. A carrier sense multiple access communications system node with collision avoidance having a transmitter for transmitting data over a communications channel, a frame transmission queuing system for maintaining a queue of data for transmission, and having a congestion detection processor for measuring the time that it takes for the transmitter to access a channel when the node has a queue of data to transmit, and to determine therefrom the availability of capacity in the network for the transmission of the remaining data in the queue,
  wherein the frame transmission queuing system is arranged to operate a data management process responsive to the congestion detection processor to reduce the number of bits in the queued data to a level where collisions are minimised,
  and further comprising channel monitoring means for measuring properties indicative of noise on the communications channel, and channel management means for modifying transmissions in response to the noise properties,
  the channel management means being arranged to attempt to reduce the noise level if the noise detected is initially above a predetermined threshold,
  and the frame transmission queuing system being arranged to transmit data only if the channel management means is successful in reducing the noise level below a predetermined threshold.

13. A carrier sense multiple access collision avoidance communications system node according to claim 12, wherein the congestion detection processor determines the fraction of time that the channel is available to the transmitter to make transmissions.

14. A carrier sense multiple access collision avoidance communications system node according to claim 12, wherein the congestion detection processor compares traffic received at a node against traffic that is expected to be received in response to transmitted data, to determine what proportion of that expected traffic is missing.

15. A carrier sense multiple access collision avoidance communications system node according to claim 12, wherein the frame transmission queuing system is arranged such that it deletes low priority traffic from the queue of data awaiting transmission in the event of low availability of capacity for data transmission being detected.

16. A carrier sense multiple access collision avoidance communications system node according to claim 12, in which implementation of channel management by the channel management means would result in an increase in the required bit rate, whilst implementation of the data management process would result in a decrease in the required bit rate.

17. A carrier sense multiple access collision avoidance communications system node according to claim 16, in which the bit rate is varied by adding or omitting error checking data.

18. A carrier sense multiple access collision avoidance communications system node according to claim 12, having a report generator to transmit reports of low availability of slots to a controlling node and to respond to commands from a controlling node to implement channel management and data management processes.

19. A carrier sense multiple access collision avoidance communications system node according to claim 12, for determining the availability of channel capacity, having a control system generating instructions to one or more subordinate nodes to apply data management measures in response to the channel capacity determined such that a guaranteed quality of service is maintained to certain users or applications.

20. A carrier sense multiple access collision avoidance communications system node according to claim 19, wherein the data management measures include selective degradation of bit rate, disconnection, handover, or forcing to an idle or inactive state of lower priority users or applications in order to maintain the guaranteed quality on other, higher priority users and applications.

21. A carrier sense multiple access collision avoidance communications system node according to claim 19, wherein the data management measures include disconnection or handover or forcing to an idle or inactive state of lower priority users or applications in order to maintain the guaranteed quality on other, higher priority users and applications.

22. A carrier sense multiple access collision avoidance communications system node according to claim 19.

23. A communications node comprising a computer processor, the communications node being configured at least to:
  operate in a carrier sense multiple access communications system with collision avoidance;
  measure properties of a communications channel indicative of noise on the channel;
  implement a channel management process to attempt to reduce the noise level if detected noise is above a threshold; and
  only if the channel management process is successful in reducing the noise level below the threshold, and the node has a queue of data to transmit:
    measure the time that it takes to gain access to a channel for transmission of the data;
    derive therefrom a measure of availability of capacity in the network; and
    operate a data management process to reduce the number of bits in the transmission to a level where collisions are minimized.

24. A node according to claim 23, wherein the measurement of availability of capacity includes measurement of the fraction of time that the channel is available to a transmitter to make transmissions.

25. A node according to claim 23, wherein the measurement of availability of capacity includes a comparison of traffic received at the node against traffic that is expected to be received in response to transmitted data, to determine what proportion of that expected traffic is missing.

26. A node according to claim 23, wherein in the event of low availability of capacity for data transmission being detected by a node, the node deletes low priority traffic from the queue of data awaiting transmission.

27. A node according to claim 23, wherein:
- implementation of the channel management process would result in an increase in the required bit rate, while implementation of the data management techniques would result in a decrease in the required bit rate; and
- the bit rate is varied by adding or omitting error checking data.

* * * * *